United States Patent [19]
Gloviak

[11] 3,943,782
[45] Mar. 16, 1976

[54] POWER HAMMER
[75] Inventor: Tom J. Gloviak, Chicago, Ill.
[73] Assignee: Skil Corporation, Chicago, Ill.
[22] Filed: Nov. 8, 1974
[21] Appl. No.: 522,017

[52] U.S. Cl. .......................... 74/50; 74/56; 173/97; 173/124
[51] Int. Cl.² ........................................ F16H 21/18
[58] Field of Search ............. 74/50, 56; 173/14, 48, 173/97, 124

[56] References Cited
UNITED STATES PATENTS

| | | | |
|---|---|---|---|
| 3,114,423 | 12/1963 | Naslund | 173/97 |
| 3,587,754 | 6/1971 | Laatsch | 173/124 |
| 3,788,403 | 1/1974 | Mitchell | 173/124 |
| 3,837,409 | 9/1974 | Consoli et al. | 173/48 |

*Primary Examiner*—John J. Camby
*Attorney, Agent, or Firm*—Clarence J. Fleming

[57] ABSTRACT

The striker is mounted in a barrel for axial reciprocal movement thereby to impart successive hammer blows to the end of a tool shank element extending into one end of said barrel. An actuator is connected to the piston by lost-motion means. A motor driven, mechanical crank assembly is connected to the actuator for reciprocating the piston such that its velocity in the hammer-direction is greater than its velocity in the return-direction.

8 Claims, 6 Drawing Figures

POWER HAMMER

BACKGROUND OF THE INVENTION

1. Field Of The Invention

The present invention relates to portable power tools of the hammer type. More particularly, the invention relates to power tools of this type wherein a striker, usually in the form of a piston, is reciprocated by power means for imparting successive impact blows to the end of a tool shank element.

2. The Prior Art

Many prior art tools of the type under consideration employ pneumatic means for reciprocating the striker piston. In this regard, reference is made to Naslund U.S. Pat. No. 3,114,423, assigned to the assignee of the present invention; this patent discloses such a pneumatically operated hammer device. According to the tool shown in the Naslund patent, a first piston is reciprocated within a barrel by the usual crankshaft and connecting rod assembly. A second piston, i.e., a striker piston, is freely mounted in the barrel and is pneumatically reciprocated as a consequence of the reciprocation of the first mentioned piston.

The use of pneumatic means for reciprocating the striker permits the development of high impact blows, and minimizes the development of rebound shocks due to the pneumatic cushion between the aforementioned pistons. These pneumatic systems reciprocate the striker or free piston in a manner such that its velocity in the hammer-direction, i.e., the direction toward the tool shank element, is greater than the velocity of the striker in the opposite direction, i.e., the returndirection. Or stated another way, the energy of such a pneumatically operated striker piston is greater in its hammerdirection than in its return-direction. The feature of having the piston returned at a lower velocity, and consequently developing less energy, is of course advantageous in that the rebound shocks or forces are minimized thereby contributing to operator comfort and increased tool life.

Such power hammers suffer from certain disadvantages. In this regard, problems are often encountered in attempting to maintain the necessary air seal between the pistons and the cylinder, especially for long periods of time and under adverse conditions to which tools of this type are subjected. Because of this seal problem, it is often difficult to start pneumatic tools in cold weather. Also, it is sometimes difficult to employ a completely sealed lubrication system with certain types of pneumatic tools.

SUMMARY AND OBJECTS OF THE INVENTION

The present invention provides a power hammer wherein the striker piston is reciprocated by mechanical means, as opposed to pneumatic means, in a manner such that the movement of the striker closely approximates the movement of a pneumatically operated striker. Thus, the present invention provides a power hammer which includes the advantages of a pneumatically operated hammer but not the disadvantages thereof. In other words, the present invention provides a power hammer wherein the piston striker is reciprocated for developing high energy forces in the hammer-direction and low energy forces in the return-direction, such that rebound and shock forces to the operator are reduced. These features are achieved without the necessity of maintaining extremely close tolerances, or using sealing rings, as is necessary in the case of pneumatically operated tools. Moreover, the power hammer of the present invention permits the use of a completely sealed lubrication system.

A primary object of the present invention is the provision of a new and improved power hammer having a mechanically operated striker piston which is reciprocated such that its velocity in the hammer-direction is greater than its velocity in the return-direction.

Another object of the present invention is the provision of a power hammer of the type described wherein the striker piston is mechanically reciprocated by means of a compound mechanical crank assembly such that the energy of the piston as it moves in its hammer-direction is greater than the energy of the piston as it moves in its return-direction.

Still another object of the present invention is the provision of a power hammer according to the foregoing object, wherein such mechanical crank assembly is connected to the striker piston by means of a lost-motion connection.

These and other objects and advantages of the invention will become apparent from the following specification disclosing a preferred embodiment shown in the accompanying drawings.

DESCRIPTION OF A PREFERRED EMBODIMENT

Figure 1:
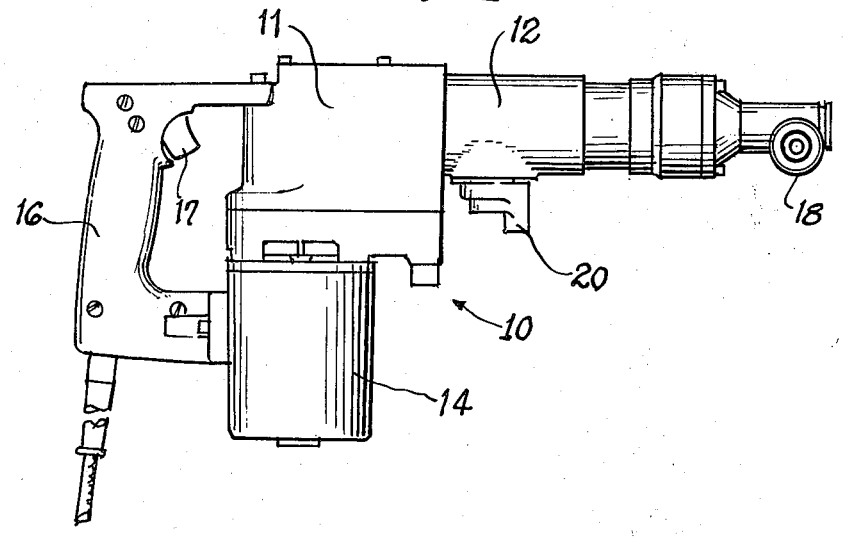
FIG. 1 is a side elevational view of a power hammer embodying the present invention.
Figure 1A:
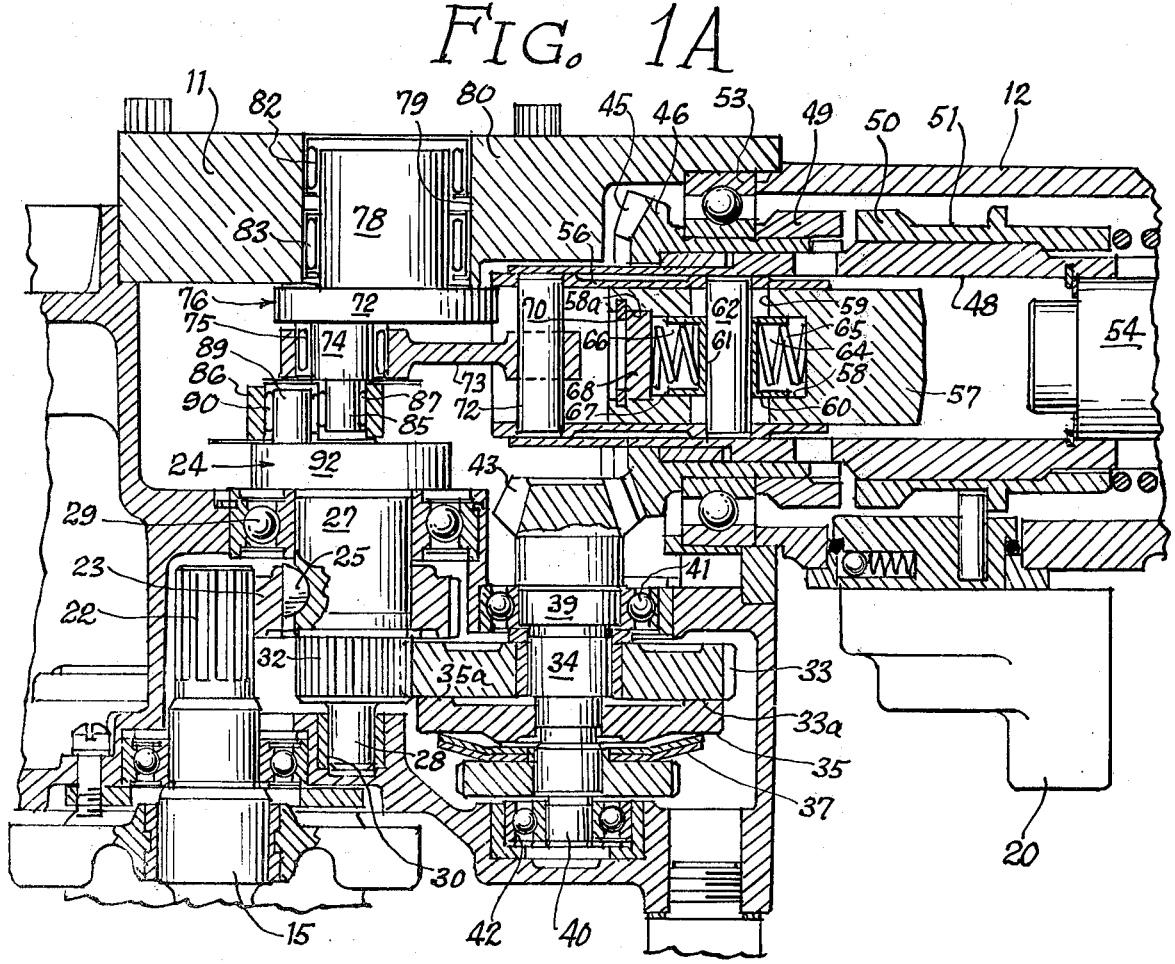
FIG. 1A is a fragmentary, enlarged, longitudinal section of the power tool of FIG. 1 showing the portion thereof embodying the present invention.

Referring to FIG. 1, the present invention is embodied in a portable, rotary power hammer, generally designated 10. Such tool includes a casing or housing 11 having a forwardly extending, cylindrical casing 12. A generally cylindrical, motor enclosure 14 is connected to the casing 11; this enclosure supports a suitable motor, preferably an electric motor having a rotary output shaft 15 (FIG. 1A). The portable power tool 10 includes a handle 16 supporting an operating trigger 17.

The power tool 10 shown for purposes of illustration is of the type adapted to impart hammering only, rotation only, or combined hammering and rotation movements to a tool bit (not shown) adapted to be detachably secured in place by a suitable retainer mechanism 18. Rotary movement to the tool bit may be selectively controlled by manual operation of a selector lever 20. At this time it should be mentioned that the present invention is not to be limited for use in power hammers of the rotary type; the present invention has equal applicability to power tools which impart hammering action only to the tool bit element.

Referring now to FIG. 1A, the end of the rotary output member 15 includes a formation of teeth 22 in meshing engagement with the teeth of a gear 23, the latter being mounted on a crankshaft, generally designated 24. The gear 23 is connected with the crankshaft 24 by means of a key 25. The crankshaft includes cylindrical portions 27 and 28 engaged with respective bearing assemblies 29 and 30, the latter supporting the crankshaft 24 for rotation about its longitudinal central axis.

The crankshaft 24 includes an annular formation of teeth 32 in meshing engagement with the teeth on a gear 33, the latter being rotatably mounted on a shaft 34. The gear 33 includes an annular face 33a in frictional engagement with an annular face 35a formed on a disc 35, which disc is connected to the shaft 34 for imparting rotation thereto. Disc-type spring washers 37 urge the annular faces 33a, 35a into frictional engagement with each other; such faces form part of a torque release clutch of well known construction to those skilled in the art and consequently such clutch requires no detailed description herein.

The shaft 34 includes cylindrical formations 39, 40 engaged with respective bearing assemblies 41, 42 thereby mounting this shaft for rotation about its longitudinal central axis. The shaft 34 includes a frusto-conical formation of teeth 43 in meshing engagement with a frusto-conical arrangement of teeth 45, the latter being formed on one end of a sleeve 46. This sleeve is mounted on a barrel 48 for rotation relative thereto.

The sleeve 46 includes an annular formation of clutch teeth 49 arranged for selective interengagement with a complimentary series of clutch teeth 50 formed on a sleeve 51. This sleeve is mounted on the barrel 48 for limited axial movement relative thereto; the sleeve 51 is keyed to the barrel 48 such that rotation of the former is imparted to the latter. Axial movement of the sleeve 51 relative to the barrel 48, for engaging and disengaging the clutch teeth 49, 50, is controlled by the manually operated selector lever 20.

It should be apparent that rotation will be imparted to the barrel 48 at times when the clutch teeth 49, 50 are in meshing engagement with each other. Thus, rotation of the barrel may be selectively controlled by the operator. Such a rotary disconnect mechanism, which of itself forms no part of the present invention, is disclosed and claimed in Consoli et al. U.S. Pat. No. 3,837,409, assigned to the assignee of the present invention; reference should be had to that patent for a detailed explanation of this disconnect or clutch mechanism.

The inner end of the barrel 48 is received within the sleeve 46, the latter being journaled for rotation in the casing 11 by an annular bearing assembly 53. The forward end of the barrel is suitably journaled in the casing 12 and is open at its forward end for receiving the end of a tool chank element (not shown). Preferably, the barrel 48 receives a reciprocally mounted tappet 54 for transferring successive impact blows to the end of such tool shank element. Reference may be had to the aforementioned Consoli et al. patent for a description of a suitable tappet or impact transferring member.

A sleeve 56 is slidably mounted within the inner end of the barrel 48 for axial reciprocal movement therein. A striker piston 57 is slidably mounted within the sleeve 56 for axial reciprocal movement relative to the latter. The piston 57 includes a blind bore 58 in communication with a transverse or diametrically extending bore 59. The blind bore 58 receives a generally cylindrical actuator retainer 60, which retainer includes a diametrically extending through bore 61 in which an actuator pin 62 is received. Opposite ends of the actuator pin are received in opposed apertures formed in the walls of the sleeve 56; thus, the actuator pin 62 moves in unison with the sleeve 56.

The retainer 60 includes a first, generally cylindrical recess 64 which cooperates with the innermost portion of the blind bore 58 to capture a coil spring 65. The actuator retainer includes an oppositely disposed, generally cylindrical recess 66 which cooperates with the bore 58 to receive another coil spring 67. This coil spring is held in place by a disctype plug 68, the latter being received in an enlarged bore portion 58a and held therein by a C-ring 70.

It will be noted that the inside diameter of the bore 59 in the striker piston 57 is substantially greater than the outside diameter of the actuator pin 62; the annular spaces thus formed between the inside of the bore 59 and the outside of the pin 62 define a lost-motion connection between the actuator pin 62 and the striker piston 57, the purpose of which connection will be explained hereinbelow. The springs 65, 67 serve to control or cushion relative movement between the striker piston and this actuator pin to reduce shock and vibration forces.

A pin 72 has its respective opposite ends received within opposed apertures formed in the walls of the sleeve 56. This pin is pivotally engaged with one end of a connecting rod 73. The other end of this connecting rod is pivotally engaged with a pin 74 through the agency of a roller bearing assembly 75. The pin 74 is integral with a crankshaft, generally designated 76, which crankshaft includes a counter-weight portion 77. The counter-weight is in turn integral with a cylindrical crankshaft portion 78 which is journaled within a bore 79 formed in a housing plate 80, this portion of the crankshaft being journaled by roller bearing assemblies 82 and 83.

The pin 74 forming part of the crankshaft 76, and eccentrically disposed with respect to the axis of rotation of the latter, includes a reduced-in-diameter pin portion 85 which is pivotally engaged with one end of a rod 86, as by means of a roller bearing assembly 87. This rod is also pivotally engaged with a pin 89 through the agency of a roller bearing assembly 90. The pin 89 is integral with and eccentric to a counter-weight formation 92, all forming part of the crankshaft 24.

The crank assembly constituted by the aforedescribed crankshafts 24, 76 and the connecting rods 73, 86 is constructed in accordance with the principles of a so-called six-link or drag-link mechanism, the latter being known per se in the field of mechanical movements. A feature of such a crank assembly is the ability to move a member in one direction with a velocity substantially greater than the velocity of such member during its movement in the return or opposite direction. As a consequence of this variation in velocity, the energy of such member is greater in its first direction of movement than in its second or opposite direction of movement. The operation of the present invention can best be understood by reference to FIGS. 2A, 2B and 2C.

Figure 2A:
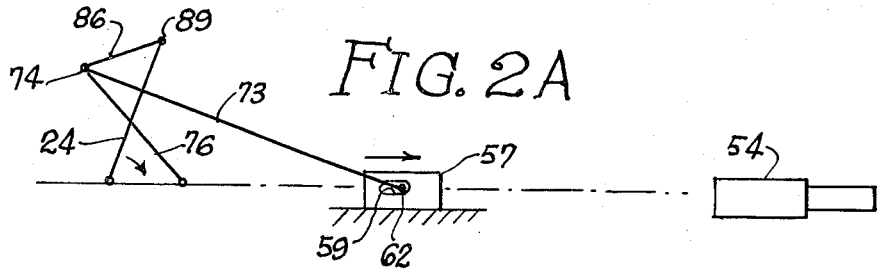
FIGS. 2A, 2B and 2C are sequential, diagramatic views illustrating the manner of operation of the crank assembly which reciprocates the striker piston.

FIG. 2A illustrates the crank mechanism as it commences accelerating the striker piston 57 toward the impact receiving tappet 54. The striker will achieve its maximum velocity about midway through its stroke toward the tappet 54, i.e., about midway during its stroke in the hammer-direction. During the initial portion of this forward movement, the actuator pin 62 will be in engagement with the forward walls of the bore 59.

After the actuator pin 62 passes the midpoint of its stroke in the hammer-direction, the latter will commence to slow down as it approaches the end of its stroke in this direction. However, this deceleration of the actuator pin 62, as a consequence of its connection with the crank arm assembly, will not be transferred to the striker piston 57, due to the action of the lost-motion connection between the striker and the actuator pin.

Figure 2B:
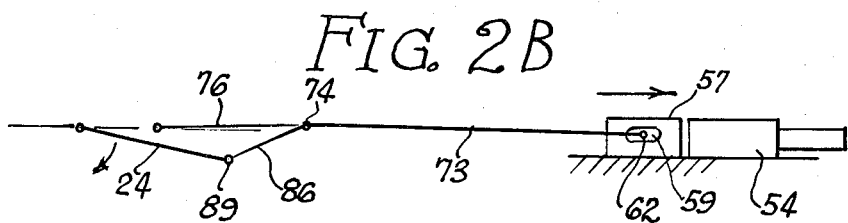

FIG. 2B shows the arrangement of the various parts just prior to the time the striker 57 impacts against the tappet 54. At the point of impact, the striker 57 is still moving and very close to its maximum velocity, slowing down somewhat, of course, due to the action of friction. At the point of impact, the pin 62 will have reached what may be termed a "dead-center" position and will be commencing its movement in the return-direction. Again, the aforementioned lost-motion connection permits this relative movement between the striker 57 and the actuator pin 62 to permit an impact blow of maximum impact to be transferred to the tappet 54. It should be understood that the crank assembly itself does not stop the striker 57 or reverse its direction of movement; the striker is stopped as a consequence of its impacting engagement with the tappet 54.

Figure 2C:
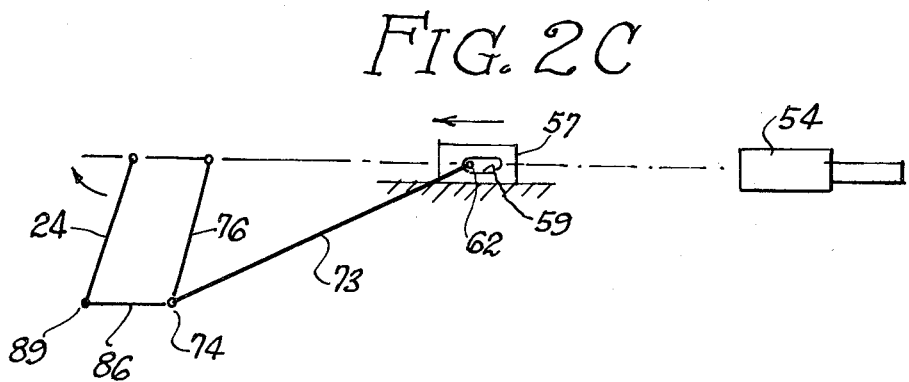

FIG. 2C shows the arrangement of the various parts as the actuator pin 62 and the striker 57 are moving in the returndirection. Now, the pin 62 will be in engagement with the rear walls of the bore 59. As mentioned above, inherent in the crank assembly is its ability to move the actuator pin 62 and striker piston 57 in the return-direction at a velocity which is less than the velocity in the hammer-direction. In the embodiment shown for purposes of illustration, the velocity of the actuator pin 62 and striker 57 in the return-direction is about 50 percent of the velocity in the hammer-direction; this results in the energy of the striker in its hammer-direction being about 3 times the energy of the striker in its return-direction. It should be understood that the respective lengths of the various crank arms and connecting rods may be varied to achieve a return velocity anywhere in the range of a few percent to 100 percent of the velocity in the hammer-direction.

The rather slow acceleration of the striker in its return-direction, as a consequence of its lower velocity in this direction, reduces the reaction forces which are felt by the operator of the tool. This feature contributes to reduced operator fatigue and to longer life of the tool.

Figure 3:
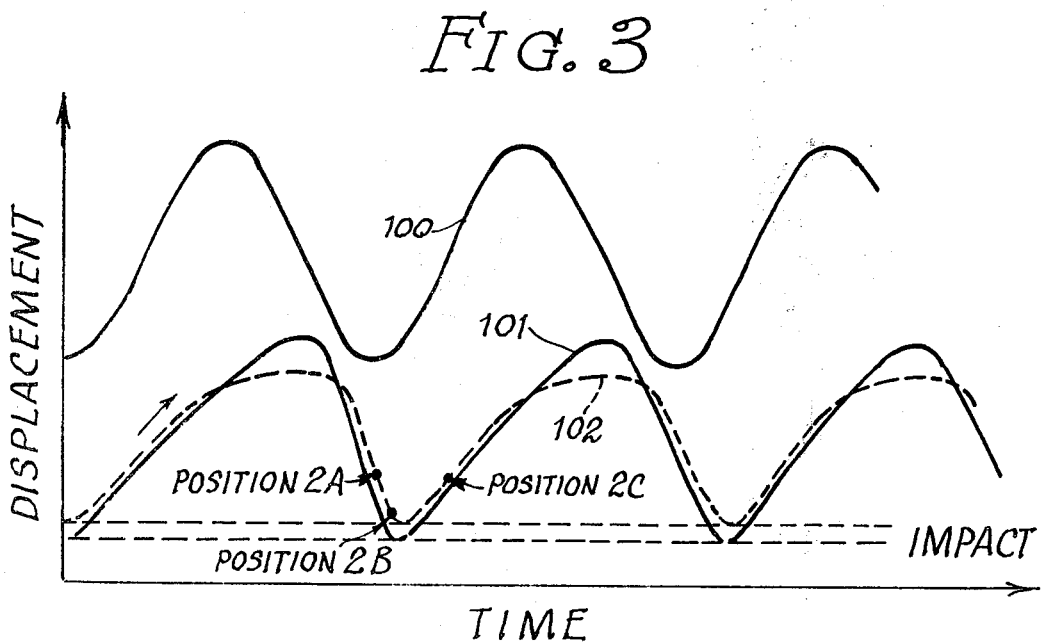
FIG. 3 is a graph representing movement of the striker piston of the present invention and the pistons of prior art, pneumatically operated tools.

Referring now to FIG. 3, curve 100 represents the movement of the power or mechanically operated piston forming part of the pneumatic system disclosed in the aforementioned Naslund patent, such curve being plotted against time as the abscissa and displacement as the ordinate. Curve 101 represents movement of the pneumatically operated piston or striker disclosed in the Naslund patent. The broken line curve 102 represents movement of the striker 57 according to the present invention; the positions of the striker illustrated in FIG. 2A, 2B and 2C are indicated on the curve 102. It is seen that the movement of the striker according to the present invention closely approximates the movement of a pneumatically operated piston, as in the aforementioned Naslund patent.

Thus, the present invention provides a power hammer wherein a piston is reciprocated solely by mechanical means and in a manner closely approximating the manner in which a pneumatically operated piston is actuated. That is to say, according to the present invention a striker piston is mechanically reciprocated with a velocity in its hammerdirection substantially greater than the velocity in its opposite or return-direction. The power hammer according to the present invention does not require extremely close tolerances between the various moving parts. The mechanical actuating means of the present invention may be sealed from the atmosphere thus facilitating lubrication by a completely sealed system.

I claim:

1. In a power hammer of the type which imparts successive hammer blows to the end of a tool element, the improvement comprising:
    a. rectilinear guide means;
    b. a striker piston mounted by said rectilinear guide means for reciprocal axial movement in a hammer-direction and in a return-direction, said piston serving to impart a hammer blow to a tool element as the former moves in the hammer-direction;
    c. a piston actuator mounted for oscillatory movement in a hammer-direction and in a return-direction and lost-motion means connecting said actuator with said piston such that oscillatory movement of the former, imparts the aforesaid axial reciprocal movement to said piston, said lost-motion means permitting limited axial movement of said piston relative to said actuator when the latter reaches the end portions of its stroke of oscillatory movement;
    d. a motor having a rotary output member; and
    e. mechanical means connecting said rotary output member with said actuator thereby to convert rotary movement of the former into said oscillating movement of the latter, said mechanical means being capable of moving said actuator in its hammer-direction at a velocity which is greater than the velocity of the actuator in its returndirection, whereby said piston is also moved in its hammer-direction at a velocity which is greater than the velocity of the piston in its return-direction.

2. The improvement according to claim 1 wherein said mechanical means comprises a crank assembly of the compound type.

3. The improvement according to claim 2 wherein said crank assembly is of the six-link drag type.

4. The improvement according to claim 1 wherein said striker piston includes a diametrically extending bore, said actuator including a pin received within said bore, the diameter of said bore being greater than the diameter of said pin, said pin and the walls of said bore constituting said lost-motion means.

5. The improvement according to claim 4 further defined by, spring means interposed between said pin and said piston for cushioning relative movement between the former and the latter.

6. The improvement according to claim 2 wherein said crank assembly includes:
    a. a first crank arm driven by the rotary output member of said motor and including an eccentrically mounted pin;
    b. a second crank arm mounted for rotation about an axis parallel with the axis of rotation of said first crank arm, which second crank arm includes an eccentrically mounted pin;
    c. a first connecting rod connected at its respective opposite ends to said pins; and d. a second connecting rod connected at its respective opposite ends to said actuator and to the pin on said second crank arm.

7. The improvement according to claim 2 wherein said crank assembly includes:
   a. a crank shaft having an eccentrically mounted pin;
   b. a connecting rod connected at its respective opposite ends to said pin and to said actuator; and
   c. crank means connecting said pin with the rotary output member of said motor for rotating said crankshaft at a variable velocity such that the energy of said striker piston, as it travels in its hammer-direction, is greater than the energy of said striker piston, as it travels in its returndirection.

8. The improvement according to claim 7 further defined by:
   a. said crank means including another crankshaft driven by the rotary output member of said motor and including an eccentrically mounted pin; and
   b. another connecting rod connected at its respective opposite ends to the pins on said crankshafts.

* * * * *